United States Patent [19]
Clark

[11] Patent Number: 5,772,388
[45] Date of Patent: Jun. 30, 1998

[54] COMBINATION HAULER FOR VEHICLE AND TRAILERED BOAT

[76] Inventor: Richard J. Clark, R.R. 1, Box 155, Gilman, Ill. 60938

[21] Appl. No.: 654,236

[22] Filed: May 28, 1996

[51] Int. Cl.⁶ .................................. B60P 3/08; B60P 3/10
[52] U.S. Cl. ...................... 414/484; 280/414.1; 414/462; 414/494
[58] Field of Search .................. 414/495, 462, 414/917, 559, 494, 471, 482–485; 280/414.1

[56] References Cited

U.S. PATENT DOCUMENTS

| | | | |
|---|---|---|---|
| 3,718,227 | 2/1973 | Swift | 414/495 |
| 3,870,339 | 3/1975 | Goff | 414/495 X |
| 4,274,788 | 6/1981 | Sutton | 414/559 X |
| 4,406,477 | 9/1983 | McDonald | 280/414.1 |
| 4,420,165 | 12/1983 | Goodin | 280/414.1 |
| 4,469,346 | 9/1984 | Low | 414/495 X |
| 4,589,814 | 5/1986 | Cates | 414/495 X |
| 4,880,250 | 11/1989 | Cravens et al. | 280/414.1 |
| 4,932,830 | 6/1990 | Woodburn | 414/559 X |
| 5,020,960 | 6/1991 | Provenson | 414/494 |
| 5,468,115 | 11/1995 | Alvis | 414/462 X |

*Primary Examiner*—David A. Bucci
*Attorney, Agent, or Firm*—Kajane McManus

[57] ABSTRACT

The combination hauler for hauling a vehicle and a loaded boat trailer comprises a wheeled horizontal flatbed to which a horizontal trailer engaging cradle is pivotably mounted. The cradle pivots from a predetermined elevated position above a front end of the flatbed to a lowered position where the cradle rests on a rear end portion of and extends beyond a rear end of the flatbed. The cradle at all times maintains a position parallel to the flatbed.

28 Claims, 3 Drawing Sheets

COMBINATION HAULER FOR VEHICLE AND TRAILERED BOAT

BACKGROUND OF THE INVENTION

1. Field of the Invention

The present invention relates to a combination hauler which is designed to haul a vehicle and a trailered boat, or empty boat trailer. Such combination hauler comprises a flatbed upon which the entire vehicle rests, with the boat in its supporting trailer, being supported above the vehicle.

2. Prior Art

Combination haulers or trailers for hauling more than one item at a time have been previously proposed.

One such trailer incorporates a boat cradle which is pivotable to elevate a rear end of a boat supported thereon above and out of the way of a car dolly of the trailer onto which the wheels of one axle of a car may be engaged, with the wheels of the other axle rolling along the ground, behind the trailer. Such trailer is also used for launching the boat and is cumbersome to use attached to a motor home.

Another combination trailer is known to comprise a flatbed trailer which has an arch at a rear end thereof. Long removable ramps lead up onto the flatbed and two side columns rise from the front of the flatbed, the side columns supporting an elevator between them which is raised and lowered with an electric winch. Centrally suspended from the arch is a manually raisable sling. A boat and trailer combination to be transported must be backed along the long ramps and the entire length of the trailer and up a further set of short ramps to a point where the rear wheels of the boat trailer rest upon elevator structure for raising the rear end thereof. The sling suspended from the arch is engaged to the boat trailer tongue. With the sling being manually winched and the elevator being electrically winched, the boat, on its trailer, is raised above flipper elements of the side columns, the flippers are lowered under the elevator and the elevator is then lowered to rest on the flippers. The boat trailer is then bolted to the framework in various places, making it part of the framework. It appears to be a long complex procedure. Further, navigating a loaded boat trailer rearwardly up two long ramps and then along the entire length of the flatbed and up a further set of ramps to the exact elevator engaging position required cannot be an easily accomplished task, probably requiring several backing attempts.

SUMMARY OF THE INVENTION

Accordingly it is a primary object of the invention to provide a combination hauler which is quickly loaded and unloaded by a single person, and wherein hauler structure accomplishes the majority of the work involved in loading and unloading the boat and its trailer.

This object, as well as others, is accomplished by the combination hauler of the present invention which comprises a wheeled flatbed including self storing ramps and having a boat trailer engaging cradle thereon which carries the trailer thereon at an elevated position above the flatbed to allow for vehicle stowage therebeneath. During loading/unloading of the boat and trailer, the cradle is designed and configured to pivot rearwardly and downwardly, to a position where a loading end thereof extends rearwardly of the hauler. Once the tongue of the boat trailer is released from the cradle, a front pivot wheel of the tongue rests on the ground and a simple tug slides the rear wheels of the boat trailer across a portion of the rear of the flatbed and down the ramps.

DESCRIPTION OF THE PREFERRED EMBODIMENT

Figure 1:
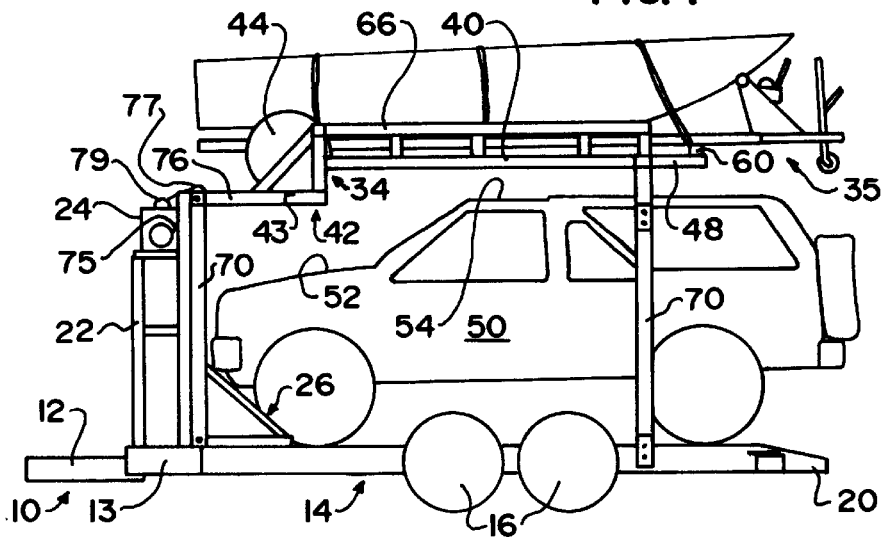
FIG. 1 is a side view of the combination hauler of the present invention showing same hauling a boat and its trailer above a vehicle.
Figure 2:
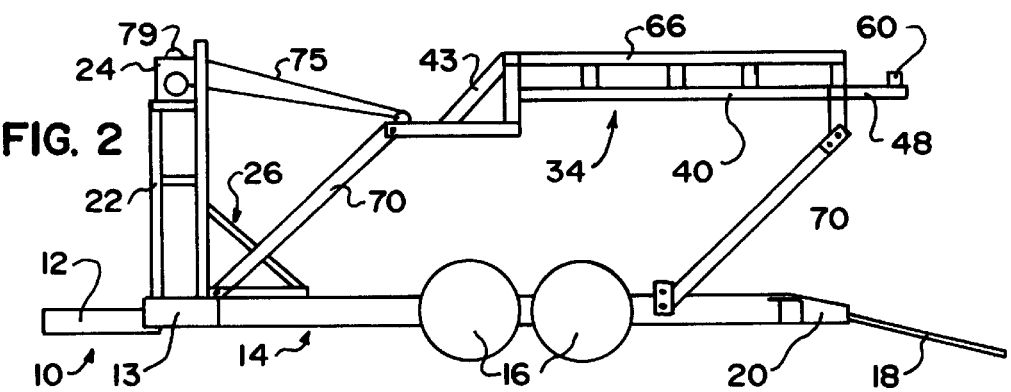
FIG. 2 is similar to FIG. 1 except that the vehicle is unloaded and the cradle is shown empty and pivoted to a position between its two extremes.
Figure 3:
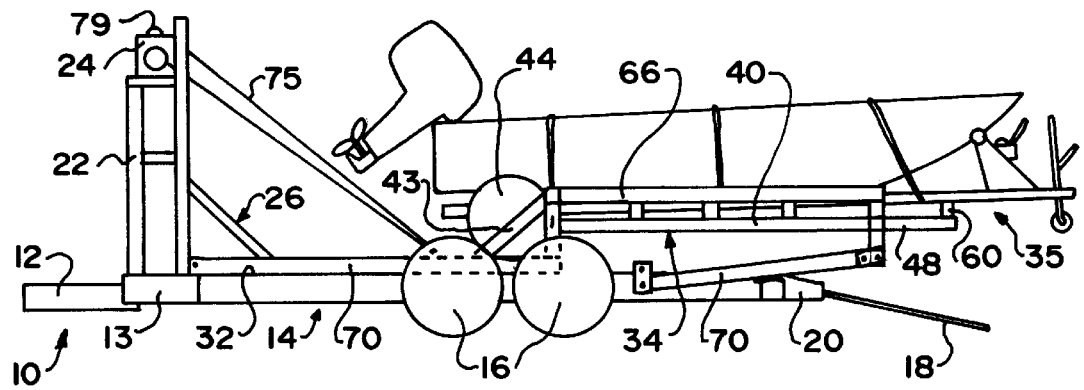
FIG. 3 is similar to FIG. 1 except it now shows the cradle in a lowered load/unload position thereof.

Referring to the drawings in greater detail there is illustrated therein a combination hauler made in accordance with the teachings of the present invention and generally identified by the reference numeral 10.

The hauler 10 includes a tongue 12 by means of which it is engaged to a hitch of a towing vehicle such as a motor home (not shown).

The tongue 12 extends outwardly from a centered position along an angulated front end 13 of a wheeled flatbed 14, the angulation being provided to accommodate pivoting of the hauler 10 relative to the hauling device. The flatbed 14 is provided with dual, or tandem axles 16 and preferably includes self stowing drop ramps 18 which extend from a rear end 20 of the flatbed 14. Extending upwardly from the end 13 is an elevated platform 22 upon which a powered winch 24 is centered, relative to the width of the flatbed 14. If desired, an angled brace assembly 26 may be provided, one end 28 of which is secured against the platform 22 and another end 30 of which is secured against a top surface 32 of the flatbed 14 to provide support for the platform 22 during winch 24 activation.

Extending above and across a major portion of the length of the flatbed 14 is a cradle 34 which accommodates a loaded boat trailer 35, loaded or unloaded. The cradle 34 includes a dolly 36 (FIGS. 4–5) comprised of two spaced apart cross bars 38 which extending between stepped side rails 40 of the cradle 34, the dolly being located forwardly of the area defining a step 42, the step 42 being positioned forwardly of a forward\afterward center point of the side rails 40. The dolly 36 is provided to support the rear wheels 44 of the boat trailer 35 between the cross bars 38 thereof. If desired, an angulated cross brace 43 may be provided to reinforce the step 42, as shown.

The side rails 40 are stepped to provide a means for maintaining the boat trailer 35 level. In this respect, the wheels 44 of the boat trailer 35 drop a significant distance below a tongue 46 of the trailer 35 when the trailer 35 is level. Elevation of the trailer tongue 46 for levelness of the trailer 35 during transportation is accomplished by the stepping of the side rails 40, a rear end 48 of which will assist in supporting the trailer tongue 46, as will be described hereinafter, to a predetermined height above the dolly 36.

Further, the step 42 of the side rails 40 allows for a minimized clearance requirement with respect to a vehicle 50 to be loaded onto the flatbed 14 under the cradle 34.

In this respect, a hood 52 of the vehicle 50 is typically at a level significantly below that of a roof 54 of the vehicle 50. If the vehicle 50 is driven onto the flatbed 14 forwardly, the depending wheel dolly 36 of the cradle 34 drops into the void or space forward of the roof 54 and above the hood 52, with the rear elevated portion 48 of the side rails 40 extending horizontally just above the roof 54. Such minimized clearance between the cradle 34 and the vehicle 50 allows the hauler 10 to accommodate transportation of vehicles 50 taller than an automobile without compromising clearance requirements for the loaded boat trailer 35 thereabove. Further, the minimized elevation of the cradle 34 drops the center of gravity of the hauler 10, for greater stability. Also, it will be understood that any vehicle 50 having a relative low rear end could be loaded rearwardly as well.

Figure 4:
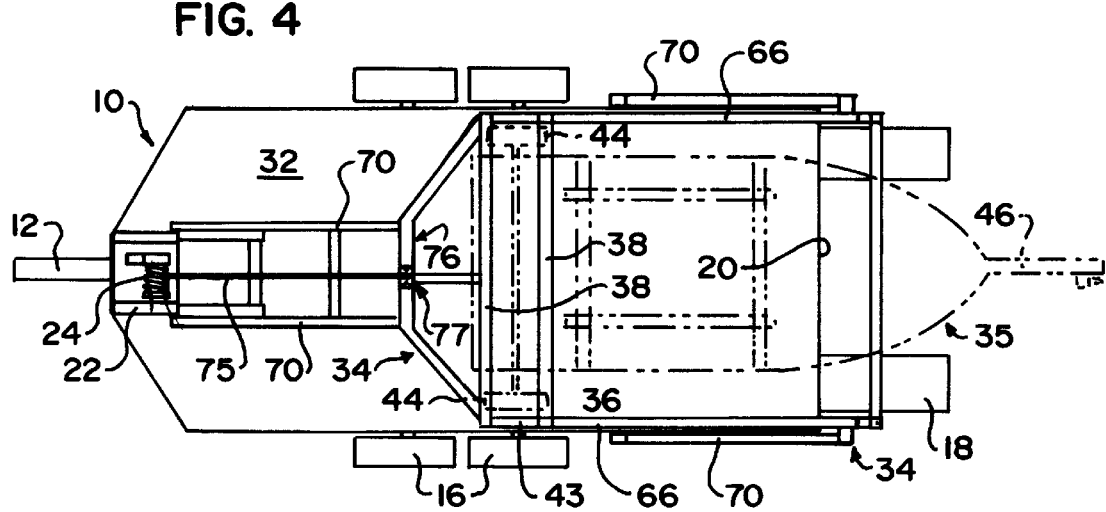
FIG. 4 is a top plan view of the hauler showing a boat trailer engaged by the cradle, trailer being defined in phantom.
Figure 5:
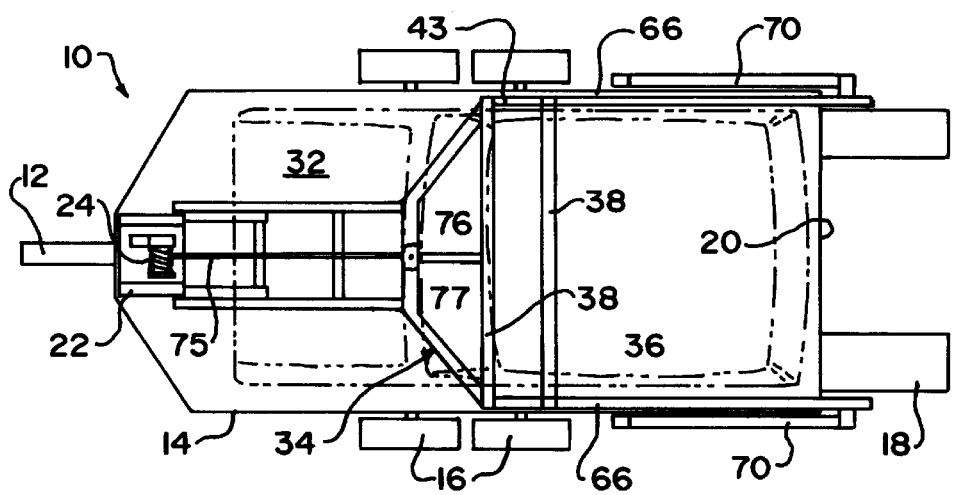
FIG. 5 is a top plan view similar to FIG. 4 but showing a vehicle in phantom on the flatbed, and showing the cradle in the lowered position thereof.
Figure 6:
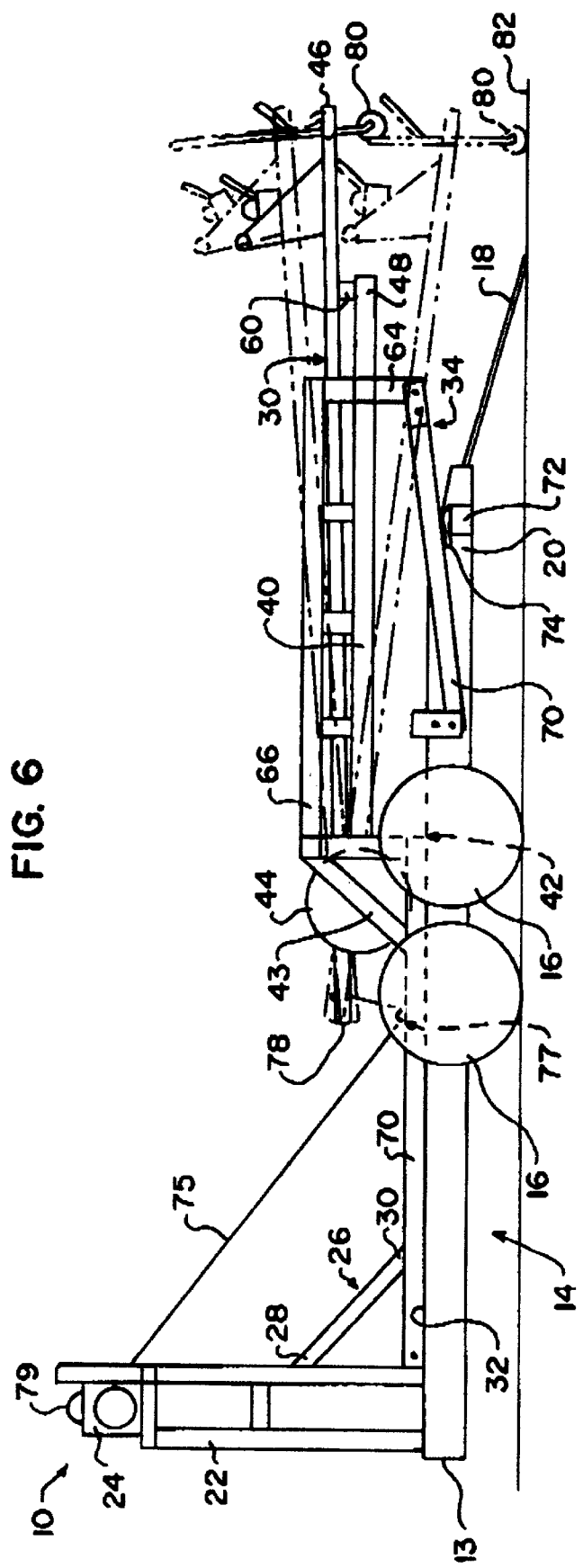
FIG. 6 is a perspective view of the boat trailer horizontally supported on the lowered cradle and shows in phantom the steps of the process of loading/unloading the trailer.

Turning now to FIGS. 4–6, it will be seen that the rear end 48 of each side rail 40 is configured to accommodate releasable engagement of a removable third cross member 60 which extends therebetween. The third cross member 60 creates a support upon which the trailer tongue 46 rests, maintaining trailer 35 levelness. The cross member 60 must be removable to allow the trailer wheels 44 a clear path to the flatbed ramps 18.

It will be seen that the rear end 48 of each side rail 40 is also provided with a depending finger 64 which is of a length approximating height of the step 42 in the side rails 40.

It is further proposed to provide an elevated reinforcing rail 66 on the rear portion 48 of each side rail 40, the guard rail 66 being parallel to the side rail portion 48 and acting to assure that the side rail portion 48 does not bow under the weight carried thereacross.

The cradle 34 is elevated above the flatbed 14 by four support posts 70. One end of each post 70 is hingedly fixed to the flatbed 14 at a predefined point directly below a lowest point of the elevated cradle 34 such that all posts 70 are parallel which vertical, with the posts 70 substantially defining corners of the cradle 34. Another end of each post 70 is hingedly fixed to the lowest corresponding point of the cradle 34, such lowest points all lying substantially in one plane. Such dual end hinging and predefined positioning of each corner post 70 essentially creates a three dimensional parallelogram, opposite sides of which are known to remain parallel regardless of the angle between adjacent sides.

Thus, regardless of the degree of relative pivoting between the posts 70 and the flatbed 14, the cradle 34 is at all times maintained horizontal.

Pivoting of the cradle 34 to its load/unload position is accomplished using the elevated winch 24 mounted at the front end of the flatbed 14. A cable 75 extending from the winch 24 is engaged through a pulley loop 77 at a centered positioned along an angulated front cross brace 76 of the cradle 34 which extends forwardly from the dolly 36 and is doubled back into engagement with a pulley 79 near the winch 24. The brace 76 is angulated to mimic the angulated front end 13 of the flatbed 14. Activation of the winch 24 allows the posts 70 to pivot downwardly from vertical, and rearwardly until the cradle 34 is resting on and extending rearwardly of the flatbed 14. It has been found through empirical testing that the posts 70 mounted toward the rear of the flatbed should be sightly longer than the forward posts 70, to keep the rear end 48 of the cradle 34 from dropping too far down by eliminating occurrence of an overcenter position which rear posts 70 of the same length as front posts 70 would create. The rear posts 70 extended angularly downwardly alongside the flatbed 14 and each rests upon a tail light housing 72 which has a cushion member 74 fixed thereover. Once the cradle 34 is lowered, in order to remove the cross bar 60 upon which the trailer tongue 46 is resting, the tongue 46 must be elevated off the cross bar 60. This can be done manually, or, if desired, the winch cable 75 can now be run through the pulley loop 77 and engaged to a structure at the rear end 78 of the trailer 35.

Tensioning of the cable 75 will cause the rear end 78 of the trailer 35 to pivot downwardly about the wheels 44, elevating the tongue 46 off the cross bar 60. The cross bar 60 is now easily removed and the cable 75 is now, causing downward pivoting of the trailer tongue 46. Because the cradle 34 extends off the rear end 20 of the flatbed 14, the tongue 46 pivots downwardly until a depending wheel 80 thereof rests on the ground 82, behind the flatbed 14 and between or just beyond the ramps 18. A pull on the tongue 46 releases the trailer wheels 44 from the dolly 36 and the trailer 35 rolls a short distance across the rear of the flatbed 14, down the ramps 14, and onto the ground 82.

If desired, to reduce the amount of pull required to cause the boat trailer wheels 44 to ride over the rearmost cross bar 38 of the dolly 36, a block (not shown) may be placed on the flatbed surface 32 as the cradle 34 is lowering to rest between the cross bars 38 of the dolly 36, raising the boat trailer wheels 44 to the level of the cross bar 38, so that the force required for pulling of the wheels 44 off the dolly 36 is reduced significantly.

When it is desired to load the boat trailer 35 onto the cradle 34, the above procedure is reversed. Here, however, the winch 24 can be brought into play to pull the trailer 35 up the ramps 18, and forwardly along the flatbed surface 32 to a point where the wheels 44 engage within the dolly 36.

The rear end 78 of the trailer 35 is then again pivoted downwardly about the wheels 44 until the trailer tongue 46 is elevated above the cradle side rails 40 so the removable cross member 60 can be engaged to support the tongue 46. Once the tongue 46 is lowered onto the cross member 60,the trailer 35 is fixed to the cradle 34 in any known manner, such as with chains, etc., the winch cable 75 is engaged in doubled manner to the double cross brace 76, and the cradle 34 is pivoted back to its elevated position. The vehicle 50 is then driven onto the flatbed 14 and the ramps 18 are restowed.

It will be understood that the cradle 34 is slightly wider than a vehicle 50 such that the vehicle 50 could be driven onto the flatbed 14 across the lowered cradle 34 if it were desired to only tow a vehicle 50, as shown in FIG. 5.

As described above, the combination hauler 10 of the present invention provides a number of advantages, some of which have been described above and others of which are inherent in the invention. Also modifications may be proposed to the hauler 10 without departing from the teachings herein. Accordingly, the scope of the invention is only to be limited as necessitated by the accompanying claims.

I claim:

1. A combination hauler for hauling a vehicle and at least a boat trailer, the hauler comprising a wheeled horizontal flatbed to which a horizontal trailer engaging cradle is pivotably mounted, the cradle including a boat trailer wheel engaging dolly at one end thereof and a removable cross bar elevated above the level of the dolly for supporting a forward end of the boat trailer at an opposite end thereof, the cradle pivoting from a predetermined elevated position above a front end of the flatbed to a lowered position where the cradle rests on a rear end portion of and extends beyond a rear end of the flatbed, the cradle and the boat trailer at all times maintaining a position parallel to the flatbed.

2. The hauler of claim 1 including an extended tongue centered along and at the front end of the flatbed.

3. The hauler of claim 2 wherein a powered winch is mounted on the front end of the flatbed, the winch being engaged upon and raised significantly above the flatbed by an elevated platform.

4. The hauler of claim 3 wherein the cradle has a forward end which abuts against the platform when the cradle is pivoted to the elevated position thereof.

5. The hauler of claim 3 wherein an angled brace assembly extends rearwardly between and is fixed to the winch platform and the flatbed.

6. The hauler of claim 2 wherein the flatbed is provided with a pair of stowable ramps at the rear end thereof.

7. The hauler of claim 6 wherein the flatbed is engaged over a pair of tandem axles.

8. The hauler of claim 1 wherein said cradle is defined by two elongate stepped side rails, which are engaged to one another by at least two crossbars.

9. The hauler of claim 8 wherein each side rail has a stepped area including a vertical rail section positioned near a front end of the side rail, creating a short lower forward rail section and a longer upper rear rail section.

10. The hauler of claim 9 wherein a first cross bar is engaged to and between the side rails at a corner point of engagement between the lower rail section and the vertical rail section of each side rail.

11. The hauler of claim 10 wherein a second cross bar is engaged between the lower rail sections at a predetermined distance forwardly of the first cross bar.

12. The hauler of claim 11 wherein said first and second crossbars form said dolly across and between which wheels of the trailer engage.

13. The hauler of claim 12 wherein a free end of each upper rear rail section engages one end of said removable crossbar which extends between the sections.

14. The hauler of claim 13 wherein each upper rear rail section has a reinforcing rail extending therealong and thereabove.

15. The hauler of claim 14 wherein the free end of each upper rear rail section has a depending finger extending downwardly therefrom, the finger terminating at a point approximately across from the corner point of engagement between the lower rail section and the vertical section.

16. The hauler of claim 15 wherein each finger has a depending free end which is pivotably engaged to one end of an elongate rear post.

17. The hauler of claim 16 wherein a free front end of each lower front rail section engages one end of an angulated front cross member.

18. The hauler of claim 17 wherein the angulated cross member includes two forwardly and inwardly extending arms, each of which joins an end of a short front section which is parallel to the dolly cross members.

19. The hauler of claim 18 wherein each end of the short front most cross member section is hingedly engaged to one end of an elongate post.

20. The hauler of claim 19 wherein the front posts are of approximately are the same length and the rear posts are approximately the same length, the rear posts being slightly longer than the front posts.

21. The hauler of claim 20 wherein all posts are parallel to one another when vertical.

22. The hauler of claim 21 wherein each post has a second end pivotably engaged to the flatbed at a position where parallel vertical positioning of the posts is maintained.

23. The hauler of claim 22 wherein each post engaged to the angulated front cross member rests against a winch platform when the posts are vertically oriented.

24. The hauler of claim 23 wherein the posts each define one side of a three dimensional parallelogram, with the cradle defining a top surface thereof and the flatbed defining a bottom surface thereof.

25. The hauler of claim 24 wherein the rear posts resting alongside the flatbed extend rearwardly and upward from the point of attachment to the flatbed when pivoted to a near horizontal position thereof.

26. The hauler of claim 25 wherein the front posts rest on the flatbed when pivoted to a horizontal position thereof.

27. The hauler of claim 24 wherein a cable of the winch extends through a pulley loop centered on the front most section of the angulated front cross member of the cradle and doubles back to a pulley loop on the platform to which it is secured.

28. The hauler of claim 27 wherein the front end of the flatbed is angulated in a manner mimicking the angulation of the angulated front cross member.

* * * * *